United States Patent [19]
Isomura

[11] Patent Number: 5,502,641
[45] Date of Patent: Mar. 26, 1996

[54] RELATIVE GPS METHOD AND APPARATUS THAT IS ABLE TO CORRECT FOR MOMEMTARY SIGNAL INTERRUPTION

[75] Inventor: Hidetoshi Isomura, Atsugi, Japan

[73] Assignee: Sokkia Co., Ltd., Tokyo, Japan

[21] Appl. No.: 289,224

[22] Filed: Aug. 12, 1994

[30] Foreign Application Priority Data

Dec. 27, 1993 [JP] Japan ................................. 5-330982

[51] Int. Cl.⁶ ..................................................... G05D 1/00
[52] U.S. Cl. ............................................................ 364/449
[58] Field of Search ................................... 364/449, 443, 364/444, 447, 448, 457; 342/357, 352, 195; 375/1, 96

[56] References Cited

U.S. PATENT DOCUMENTS

| | | | |
|---|---|---|---|
| 4,821,294 | 4/1989 | Thomas, Jr. | 375/96 |
| 4,894,662 | 1/1990 | Counselman | 342/357 |
| 4,928,106 | 5/1990 | Ashjaee et al. | 342/352 |
| 4,983,980 | 1/1991 | Ando | 342/357 |
| 5,019,824 | 5/1991 | Kumar | 342/195 |
| 5,036,329 | 8/1991 | Ando | 342/357 |
| 5,081,462 | 1/1992 | Tachita et al. | 342/352 |
| 5,101,416 | 3/1992 | Fenton et al. | 375/1 |
| 5,192,957 | 3/1993 | Kennedy | 342/357 |
| 5,225,842 | 8/1993 | Brown et al. | 342/357 |
| 5,252,982 | 10/1993 | Frei | 342/357 |
| 5,323,322 | 7/1994 | Mueller et al. | 364/449 |
| 5,359,332 | 10/1994 | Allison et al. | 342/357 |

FOREIGN PATENT DOCUMENTS 2120489  2/1983  United Kingdom .

Primary Examiner—Kevin J. Teska
Assistant Examiner—Dan Fiul
Attorney, Agent, or Firm—Armstrong, Westerman, Hattori, McLeland & Naughton

[57] ABSTRACT

A GPS surveying system uses at least four GPS satellites which travel on satellite orbits and a GPS surveying system having a first receiving apparatus for receiving radio waves to be transmitted from each of the GPS satellites and a second receiving apparatus for receiving radio waves to be transmitted from each of the GPS satellites. The first receiving apparatus is disposed in a known point and the second receiving apparatus is disposed in an unknown point. An integrated carrier phase of the radio waves to be received by each of the receiving apparatuses is measured. The integrated carrier phase is recorded at every predetermined interval of time. Three-dimensional coordinate values of the unknown point are obtained based on the recorded integrated carrier phase. When interruption of receiving of the radio waves to be transmitted from the GPS satellites has occurred during the measuring and the recording step, the interruption of receiving is detected. A cycle slip included in the measured integrated carrier phase is corrected after ceasing of the interruption of receiving by adding a correction amount of an integer number value to the integrated carrier phase at a predetermined time before the integration of receiving.

4 Claims, 4 Drawing Sheets

RELATIVE GPS METHOD AND APPARATUS THAT IS ABLE TO CORRECT FOR MOMEMTARY SIGNAL INTERRUPTION

BACKGROUND OF THE INVENTION

1. Field of the Invention

The present invention relates to a relative positioning GPS (Global Positioning System) using a GPS surveying system and relates, in particular, to a relative positioning GPS in which, even if an interruption of receiving of radio waves from GPS satellites occurs, an integrated carrier phase (i.e., an integrated value of the carrier phase of the radio waves; also called a carrier beat phase) with a corrected "cycle slip" is recorded, and coordinate values of the three-dimensional coordinates of an unknown point can be obtained. The present invention also relates to an apparatus for carrying out a relative positioning GPS. In the present specification and claims of the application, the term "relative positioning GPS" means a method of positioning using the GPS surveying system. This method is also alternatively called a "GPS interferometry."

2. Description of Related Art

GPS satellites travel in circular orbits about 20,200 km above the earth's surface such that they rotate at a period of exactly two times per one rotation of the earth in the space. It follows that, when space is looked at from one fixed point on the earth's surface, the GPS satellites which travel spatially on the same orbits while gaining about 4 minutes per day can be observed.

On these GPS satellites there are mounted atomic clocks of secium and lubidium and they are used as a frequency standard in generating a reference frequency, e.g., for carrier waves for the radio waves or the like.

On the other hand, there is also provided GPS-related equipment on the ground, and an operation is being carried out to maintain the function of the GPS. For example, in order to grasp the accurate positions of the GPS satellites, there are provided on the ground satellite tracking stations for tracking the orbits of the GPS satellites over the entire surface of the earth. Measured results as observed in these satellite tracking stations are sent to a GPS main analyzing station for carrying out a concentrated analysis therein, thereby calculating expected orbits of the GPS satellites in the near future. The information relating to the expected orbits is transmitted to the GPS satellites and is transmitted from the GPS satellites to GPS users on the ground together with various kinds of information.

GPS satellites transmit radio waves of the following two kinds of frequencies with the frequency of 10.23 MHz as a basic frequency, i.e., one being L1 band of the frequency 1575.42 MHz which is 154 times the basic frequency and the other being L2 band of 1227.60 MHz which is 120 times the basic frequency. The L1 band contains a P code, a C/A code and navigation messages in the form of phase modulation.

Among them is included clock information. If the clocks provided in the GPS satellites and the clock in the receiving apparatus which is positioned in a survey point are synchronized with each other, the propagation delay time of the radio waves can be obtained from the difference between the time at which they are transmitted and the real time at which they are received. From this delay time and the speed of light the distance between the survey point and each GPS satellite can be calculated. On the other hand, since the values of the three-dimensional coordinates of each GPS satellite can be obtained from the orbit information, if there are three or more spheres each of which has a radius equivalent to the distance between each GPS satellite and the survey point, with the position of each GPS satellite being as an origin, the three-dimensional coordinates of the survey point can be obtained as a point at which these spheres cross each other.

This kind of positioning method is called a single or independent positioning method. The three-dimensional coordinate values obtained by this method are nothing but approximate ones and contain an error of several meters or more. They are therefore not suitable for high-accuracy positioning.

As a solution, it has consequently been practiced to receive the radio waves transmitted from a plurality of GPS satellites, and measure and analyze an integrated carrier phase and obtain the three-dimensional coordinate values of an unknown point with a high accuracy.

However, the radio waves transmitted from the GPS satellites are subject to various kinds of obstacles, and their receiving on the side of the receiving apparatus is sometimes interrupted instantly or continuously. Until the obstacles are removed, the radio waves to be transmitted from the GPS satellites cannot be received. Consequently, the amount of changes of the integrated carrier phase during this interruption cannot be known. This kind of dropping or lacking of measured data due to receiving obstacles is called a "cycle slip" and is regarded to be a serious problem in the positioning operation using the GPS surveying system.

By the way, this kind of receiving obstacles rarely occurs through a fault of the GPS satellites or the receiving apparatuses themselves, but mostly occurs due to a receiving environment. As examples of this kind of obstacles, the following can be listed.

1) Interruption by obstacles in the form of objects on the ground such as branches of trees, power cables, telephone cables, etc. while the GPS satellites are behind the shades thereof.

2) Adhesion of snow and/or ice on an antenna.

3) Out of tuning of the phase synchronization loop of the receiving apparatus due to noise obstacles of excessively strong pulses from electric equipment such as an electric resistance welding machine, rails of electric trains, or the like.

4) Malfunctioning of the phase synchronization loop due to jamming radio wave disturbance which is continuous to a certain degree such, for example, as radar radio waves.

5) Obstacles due to fading and shades through interference by reflecting radio waves against helicopters, airplanes, or the like.

6) Obstacles by birds such as flying in stocks around an antenna or perching of birds on the antenna.

Among these obstacles, the cycle slip due to the above-described item 1) is likely to occur when GPS satellites of smaller angle of elevation are observed. They can, however, be prevented by paying attention to the location of placing the antenna of the receiving apparatus. The cycle slip due to the above-described item 2) can also be prevented to a certain degree by taking the necessary measures considering the location of placing the antenna or the meteorological conditions.

The obstacles due to the remaining items are, however, generally hard both to anticipate and to prevent, and the occurrence of interruption of receiving the radio waves cannot be avoided. Once the interruption of receiving has occurred and consequently the measured values contain a cycle slip, it becomes necessary, apart from the case where measurement is made again, to correct the phase amount of the carrier waves that changed during that period.

When the receiving apparatus detects the phase of the carrier waves, it can directly detect the values within the range of 0° through 360°, but it cannot directly detect the amounts exceeding 360°. Therefore, it is necessary to continuously detect the phase of the carrier waves and store the amount of changes beyond 360° by, for example, advancing a counter each time 360° is reached. If the phase is represented as the number of waves, 360° will be "1" and the advance amount of the counter is a value representing the phase as it is. The integrated carrier phase $\omega_s$ based on a predetermined time can be represented by the value $\omega_m$ ($0 \leq \omega_m < 1$) that is actually being detected at that instant and the value n on the counter at that instant as $$\omega_s = \omega_m + n$$

The integrated carrier phase $\omega_s'$ at a lapse of time $\Delta t$ after the detection of the above-described $\omega_m$ can be represented by the value $\omega_m'$ that is actually being detected at that instant and the advance amount $\Delta n$ on the counter during the above-described $\Delta t$ as $$\omega_s' = \omega_m' + (n + \Delta n)$$

However, in case where the above-described period of time $\Delta t$ happens to fall on the period of interruption of receiving in which the phase of the carrier waves cannot be detected, the counter cannot be advanced during the period of interruption of receiving. Consequently, the value of the above-described $\omega_m'$ after ceasing of the interruption of receiving may be detected, but the advance amount of the above-described $\Delta n$ cannot be obtained.

Here, since the advance amount $\Delta n$ is an integer value, the integrated carrier phase that was lost during the interruption of receiving also becomes an integer value. It is in this point that major characteristics of the cycle slip of the GPS surveying lie.

In the conventional art, the following is practiced to cope with the above disadvantage. Namely, the measured values are recorded at every certain interval of time and, after a series of measuring procedures have been finished and at the time of "post processing" in which the three-dimensional coordinates of the unknown point are obtained, corrections are made for the cycle slip that occurred due to the interruption of receiving.

In the so-called kinematic surveying in which the integrated carrier phases are recorded while measuring them by sequentially moving the receiving apparatus among the unknown points, the correction of the cycle slip cannot be made after the measurement, should interruption of receiving occur during the moving operation. As a solution, in such a case, it is necessary to temporarily finish the measuring before the interruption of receiving occurs and to measure again by going back to the unknown point where the integrated carrier phase has been recorded.

The present invention has been made in view of these kind of disadvantages of the conventional art. The present invention has an object of providing a relative positioning GPS in which interruption of receiving of the radio waves, when it occurs, can be detected, and measured values are recorded after correcting the cycle slip, and the coordinate values of the three-dimensional coordinates of the unknown point can be obtained based on the recorded measured values.

Another object of the present invention is to provide an apparatus for carrying out the above-described relative positioning GPS.

SUMMARY OF THE INVENTION

According to the present invention, the foregoing and other objects are attained by a relative positioning GPS using at least four GPS satellites which travel on satellite orbits and a GPS surveying system having a first receiving apparatus for receiving radio waves to be transmitted from each of said GPS satellites and a second receiving apparatus for receiving radio waves to be transmitted from each of the GPS satellites, the relative positioning GPS comprising the steps of: disposing the first receiving apparatus in a known point; disposing the second receiving apparatus in an unknown point; measuring an integrated carrier phase of the radio waves to be received by each of the receiving apparatuses; recording the integrated carrier phase at every predetermined interval of time; and obtaining three-dimensional coordinate values of the unknown point based on the recorded integrated carrier phase; wherein, when interruption of receiving of the radio waves to be transmitted from the GPS satellites has occurred during the measuring and recording steps, the interruption of receiving is detected and a cycle slip included in the measured integrated carrier phase is corrected after ceasing of the interruption of receiving.

In a preferred embodiment, the three-dimensional coordinate values of each unknown point are obtained by moving the second receiving apparatus among unknown points.

The relative positioning GPS preferably further comprises obtaining an average value of a rate of change of an integrated carrier phase at a predetermined time before the interruption of receiving and a rate of change of an integrated carrier phase at a predetermined time after ceasing of the interruption of receiving; calculating a correction amount of a real number value by multiplying the average value by a time between the predetermined time before the interruption of receiving and the predetermined time after ceasing of the interruption of receiving; and correcting the cycle slip included in the integrated carrier phase after the ceasing of the interruption of receiving by adding the correction amount of the real number value to the integrated carrier phase at the predetermined time before the interruption of receiving.

The relative positioning GPS preferably further comprises obtaining an average value of a rate of change of an integrated carrier phase at a predetermined time before the interruption of receiving and a rate of change of an integrated carrier phase at a predetermined time after ceasing of the interruption of receiving; calculating a correction amount of a real number value by multiplying the average value by a time between the predetermined time before the interruption of receiving and the predetermined time after ceasing of the interruption of receiving; calculating a correction amount of an integer number value by rounding the correction amount of the real number value to a nearest integer number; and correcting the cycle slip included in the integrated carrier phase after the ceasing of the interruption of receiving by adding the correction amount of the integer number value to the integrated carrier phase at the predetermined time before the interruption of receiving.

According to another aspect of the present invention, the above and other objects are attained by an apparatus for carrying out a relative positioning GPS using at least four GPS satellites which travel on satellite orbits, a first receiving apparatus disposed in a known point and arranged for receiving radio waves to be transmitted from each of the GPS satellites and a second receiving apparatus disposed in another point and arranged for receiving radio waves to be transmitted from each of the GPS satellites, the apparatus comprising: means for calculating integrated carrier phases of the radio waves to be received by the first receiving apparatus and the second receiving apparatus; means for recording the integrated carrier phases at every predetermined interval of time; means for computing three-dimensional coordinate values of the unknown point based on the recorded integrated carrier phases; wherein the means for calculating integrated carrier phases detects an interruption of receiving of the radio waves to be transmitted from the GPS satellites when such an interruption of receiving has occurred, corrects a cycle slip included in the measured integrated carrier phases after ceasing of the interruption of receiving, and records on the means for recording the integrated carrier phase after the correction so as to obtain three-dimensional coordinates of the unknown point.

It is preferable that the second receiving apparatus is arranged to be movable among unknown points.

Preferably, the means for calculating the integrated carrier phases obtains an average value of a rate of change of an integrated carrier phase at a predetermined time before the interruption of receiving and a rate of change of an integrated carrier phase at a predetermined time after ceasing of the interruption of receiving, calculates a correction amount of a real number value by multiplying the average value by a time between the predetermined time before the interruption of receiving and the predetermined time after ceasing of the interruption of receiving; and corrects a cycle slip included in the integrated carrier phase after the ceasing of the interruption by adding the correction amount of the real number value to the integrated carrier phase at the predetermined time before the interruption of receiving.

It is preferable that the means for calculating integrated carrier phases obtains an average value of a rate of change of a carrier beat phase at a predetermined time before the interruption of receiving and a rate of change of an integrated carrier phase at a predetermined time after ceasing of the interruption of receiving, calculates a correction amount of a real number value by multiplying the average value by a time between the predetermined time before the interruption of receiving and the predetermined time after ceasing of the interruption of receiving, calculates a correction amount of an integer number value by rounding the correction amount of the real number value to a nearest integer number, and corrects a cycle slip included in the integrated carrier phase after the ceasing of the interruption of receiving by adding the correction amount of the integer number value to the integrated carrier phase at the predetermined time before the interruption of receiving.

When there are used a relative positioning GPS using at least four GPS satellites which travel on satellite orbits, and a GPS surveying system having a first receiving apparatus for receiving radio waves to be transmitted from each of the GPS satellites and a second receiving apparatus for receiving radio waves to be transmitted from each of the GPS satellites, and the first receiving apparatus is disposed in a known point and the second receiving apparatus is disposed in an unknown point to thereby measure integrated carrier phases of the radio waves to be received by each of the receiving apparatuses, and the integrated carrier phases are recorded at every predetermined interval of time, it is possible to set up the same number of simultaneous equations as the number of the unknown points based on the received integrated carrier phases. The three-dimensional coordinate values of the unknown point can therefore be obtained by analyzing the simultaneous equations.

When receiving of radio waves to be transmitted from the GPS satellites has been interrupted, this interruption of receiving is detected, a cycle slip that is included in the integrated carrier phases after the interruption of receiving has ceased is corrected, and the integrated carrier phases after the correction is recorded. Therefore, in analyzing the simultaneous equations, the correction of the cycle slip need not be made.

Further, in carrying out the so-called kinematic surveying in which the second receiving apparatus is moved, while carrying out measuring, among the unknown points to thereby obtain the three-dimensional coordinate values of each unknown point, the correction of the cycle slip is made before recording the integrated carrier phases. Therefore, it is not necessary to measure again by going back to the unknown point whose measuring has already been finished before the occurrence of the interruption of receiving.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
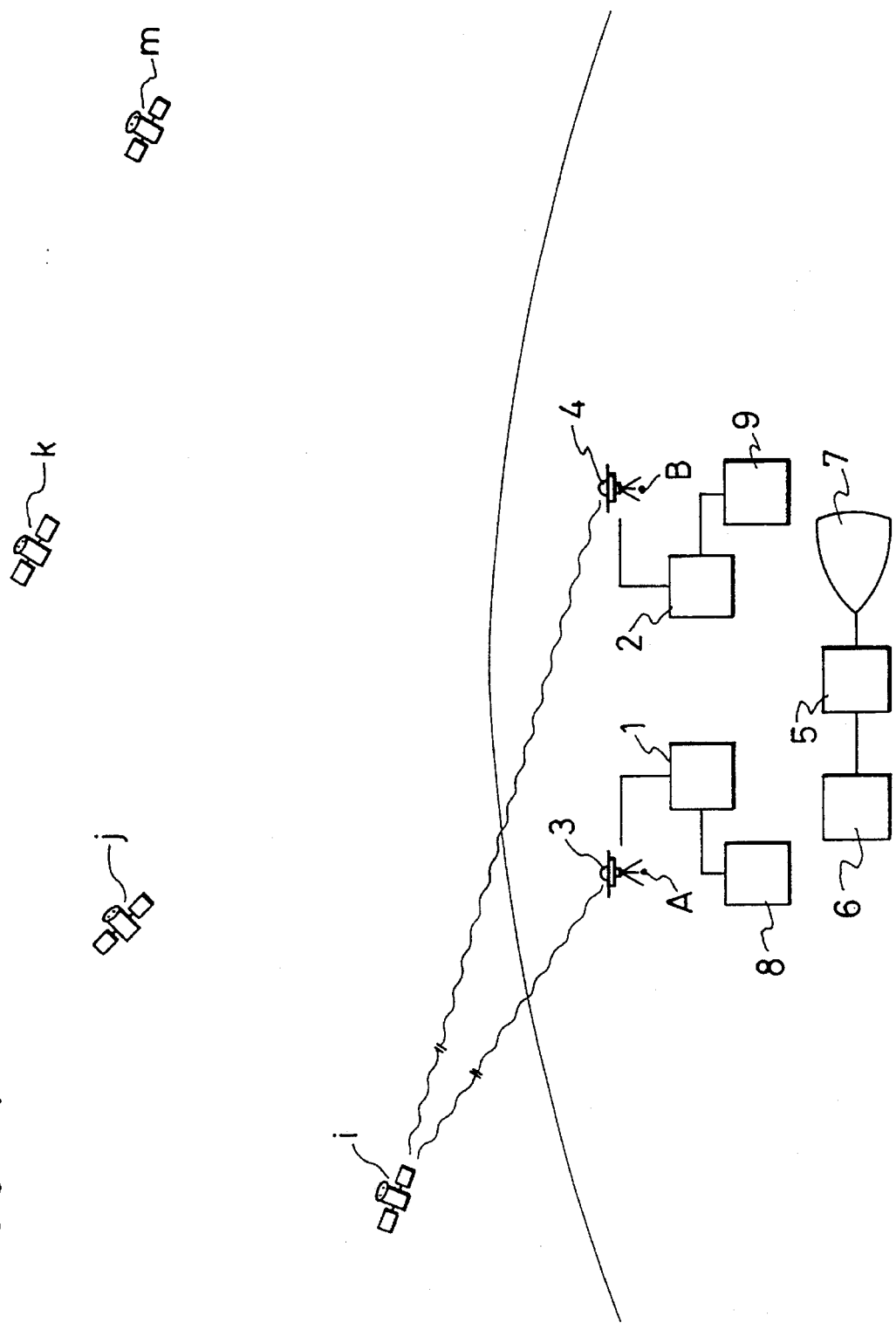
FIG. 1 is a schematic diagram showing an example of the GPS surveying system to be used in the present invention.

FIG. 1 shows an example of a GPS surveying system which is used in the present invention.

Referring to FIG. 1, satellite i, satellite j, satellite k and satellite m are GPS satellites which travel on satellite orbits. Each of the satellites has a frequency standard and transmits radio waves of L1 band and L2 band. A survey point A is a known point where an antenna 3 for a first receiving apparatus 1 is positioned for receiving the radio waves to be transmitted from the above-described four GPS satellites. A survey point B is an unknown point where an antenna 4 for a second receiving apparatus 2 is positioned for receiving the radio waves to be transmitted from the above-described four GPS satellites. A RAM card drive apparatus 8, 9 is respectively connected to the first receiving apparatus 1 and the second receiving apparatus 2. In each RAM card drive apparatus 8, 9 there is inserted a RAM card which is a recording apparatus (not shown). Each of the receiving apparatuses 1, 2 measures an integrated value of the phase of the carrier waves of the radio waves, i.e., an integrated carrier phase or also called a carrier beat phase, of the L1 band or the L2 band, and records the measured value in the RAM cards by means of the RAM card drive apparatuses 8, 9. After the measuring has been finished, the contents recorded in the RAM cards are read by a RAM card drive apparatus 6 which is provided in a host computer 5. The integrated carrier phases are analyzed to obtain the coordinates of the three dimensional coordinate values of the unknown point B, which are then displayed in a display apparatus 7.

Figure 2:
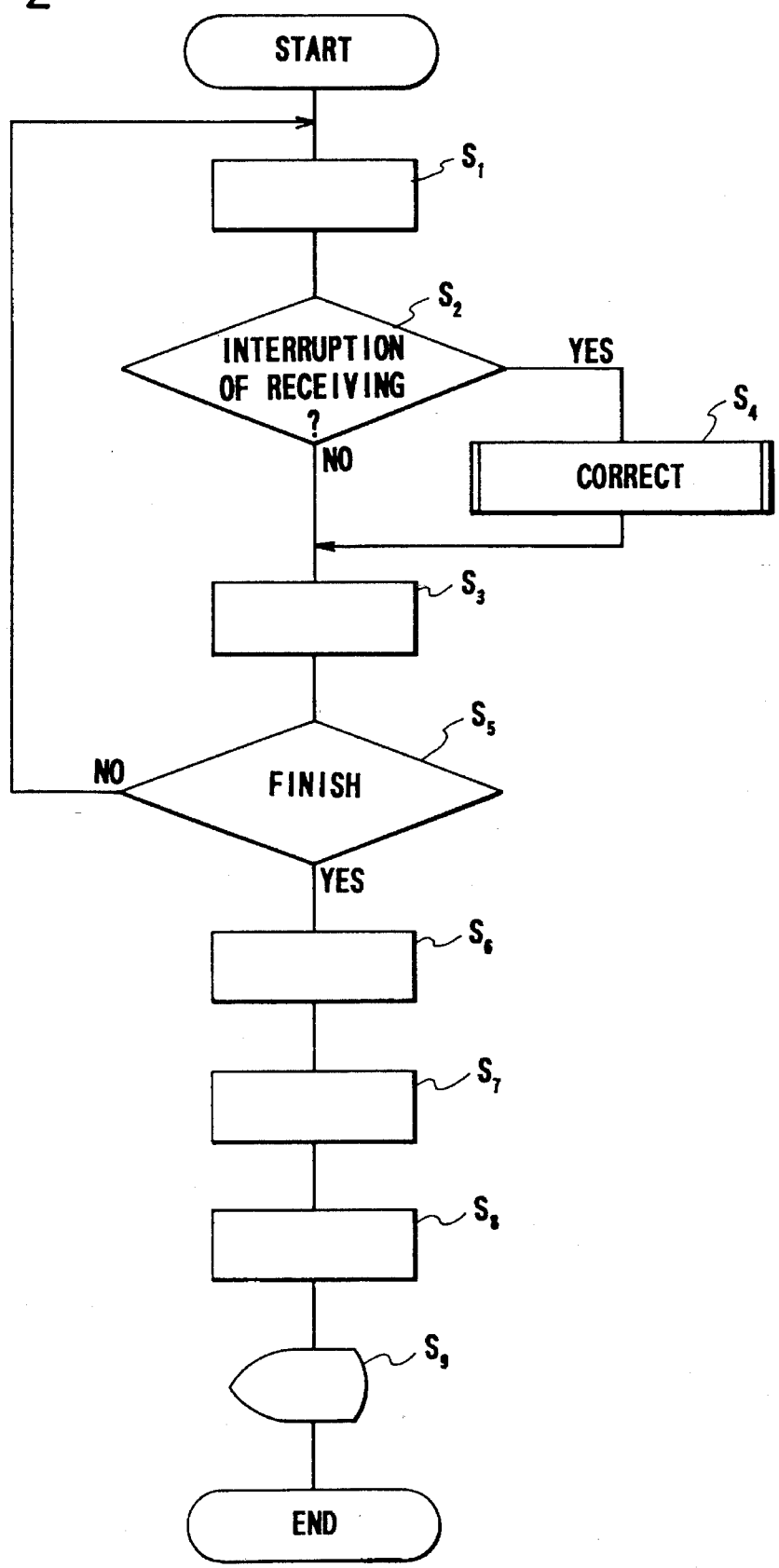
FIG. 2 is flow chart showing one example of the present invention.

FIG. 2 is a flow chart showing the processing procedure or a program of an example of the present invention using the above-described GPS surveying system.

Referring to FIG. 2, reference numeral S1 denotes a measuring step in which the integrated carrier phases are measured by the first receiving apparatus 1 and the second measuring apparatus 2. Normally, the data measured by the receiving apparatuses are stored at a predetermined interval in a memory apparatus such as a RAM or the like. However, in order to store all of the measured data, the storage capacity of memory apparatus becomes large, with the result that the receiving apparatuses become large and that the cost of the apparatuses become high. In such a case, it is also possible to store the measured date in the host computer by on-line transmission. It is, however, difficult to do so in the kinematic surveying.

Therefore, in an ordinary kinematic surveying, the following operations become necessary. Namely, by using the GPS surveying system as shown in FIG. 1, the measured data stored in an internal memory apparatus such as a RAM or the like provided in the receiving apparatus are recorded in a recording medium such as a RAM card or the like which can transfer the recorded contents to the host computer while maintaining the recorded contents as they are. By resetting the internal memory apparatus, the storage capacity is effectively utilized.

Let the time at which the measured values are stored in the recording period be called an "epoch" and the interval between the adjoining epochs be called an "epoch interval." For example, when measurement is made for 2 hours at an epoch interval of 15 seconds, the frequency of recording the measured values, i.e., the number of epochs is 480.

Figure 3:
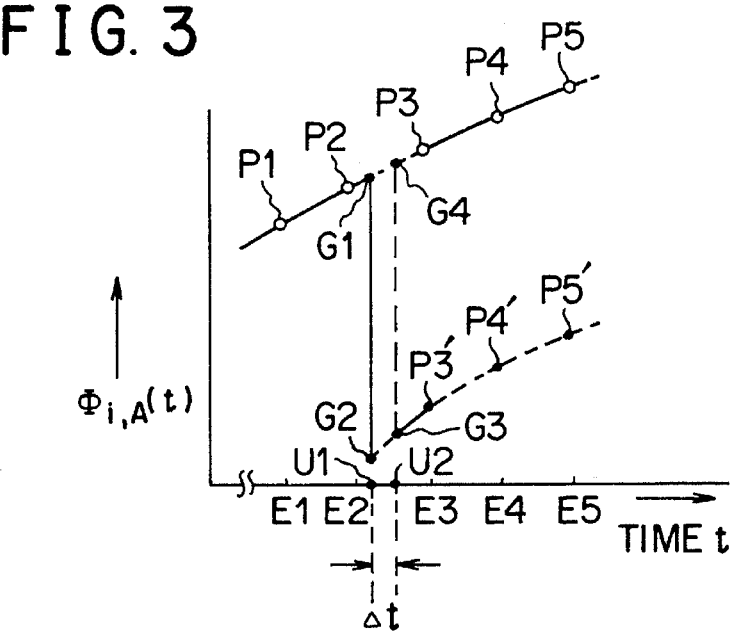
FIG. 3 is a diagram showing the change in integrated carrier phase when interruption of receiving has occurred.

FIG. 3 is an example of the measured results showing the relationship between the integrated carrier phase and each epoch. E1 through E5 show epochs for recording the integrated carrier phases P1 through P5, respectively.

Here, the integrated carrier phase means the amount corresponding to the distance between the GPS satellite and the point where the receiving apparatus is positioned, the amount being represented in the number of waves of the carrier waves. The contents of this integrated carrier phase are explained hereinbelow in an example in which the radio waves to be transmitted from the GPS satellite i are received by the receiving apparatus 1 and in which the integrated carrier phase at a predetermined reference time is measured.

Let an arbitrary time from the above-described reference time to the above-described epoch E1 be $t_1$ and let the integrated carrier phase from the reference time to the time t1 be $\Phi_{i,A}(t_1)$. Similarly, let the amount of integration of the number of waves of the carrier waves for the radio waves to be detected by the receiving apparatus 1 during the time up to the time t1 be an amount of received phase $\Phi_A(t_1)$ and let the amount of integration of the number of waves of the frequency standard of the receiving apparatus 1 be an amount of frequency standard phase $\psi_A(t_1)$. Then, the integrated carrier phase $\Phi_{i,A}(t_1)$, as expressed by the number of waves, can be given by the following formula:

$$\Phi_{i,A}(t_1) = \psi_A(t_1) - \phi_A(t_1) + N_{iA} \quad (2)$$

wherein $N_{iA}$ is an integer value and is a constant which is called an integer value bias. Therefore, in case where the integrated carrier phase from the reference time to the time at which the measurement is started is unknown, this value cannot be directly obtained.

In the above formula the integrated carrier phase is a value that corresponds to the difference between that number of waves which is the phase of the detected carrier waves and that number of waves which is the phase of the frequency standard. Therefore, if the frequency standard is correctly set to the L1 band frequency or to the L2 band frequency, the above-described integrated carrier phase can be considered to be an amount which corresponds to the frequency variation through Doppler effect due to the relative movement between the GPS satellite and the receiving apparatus.

If time $\tau$ is supposed to be required for the radio waves transmitted from the GPS satellite i to reach the survey point A, the radio waves that reached the survey point A at time $t_1$ had been transmitted from the GPS satellite i at time $t_1 - \tau$. Let the number of waves of the carrier waves of the radio waves emitted from the GPS satellite i from the reference time to the time $t_1 - \tau$ be an amount of transmitted phase $\phi_i(t_1 - \tau)$ and let the number of waves of the radio waves received by the receiving apparatus 1 from the reference time to time $t_1$ be an amount of received phase $\phi_A(t_1)$. Then the amount of transmitted phase $\phi_i(t_1 - \tau)$ and the amount of received phase $\phi_A(t_1)$ become equal to each other as shown by the following formula.

$$\phi_A(t_1) = \phi_i(t_1 - \tau) \quad (3)$$

In this formula, since $\tau$ is a small value, the right side of the above formula can be developed as follows.

$$\phi_i(t_1 - \tau) = \phi_i(t_1) - \partial \phi_i(t_1)/\partial \tau \cdot \tau + \ldots \quad (4)$$

Let the phase of the carrier waves of the radio waves to be transmitted from the GPS satellite i be the amount of transmitted phase $\phi_i(t_1)$. Then the frequency f of the carrier waves can be given by the variation of the amount of transmitted phase $\phi_i(t_1)$ per minute time as follows.

$$f = \partial \phi_i(t_1)/\partial \tau \quad (5)$$

Formula (3) can therefore be re-written as follows by using the formulae (4) and (5).

$$\phi_A(t_1) = \phi_i(t_1) - f \cdot \tau \quad (6)$$

If formula (2) is substituted by formula (6), the following formula can be obtained.

$$\Phi_{i,A}(t_1) = \psi_A(t_1) - \phi_i(t_1) + f \cdot \tau + N_{iA} \quad (7)$$

wherein the amount of the frequency standard phase $\psi_A(t_1)$ is an amount which corresponds to the clock (receiver clock) which is provided in the receiving apparatus 1, and the amount of transmitted phase $\phi_i(t_1)$ is an amount which corresponds to the clock (satellite clock) which is provided in the GPS satellite i. If the difference between the two is given by the formula $$\psi_A(t_1) - \phi_i(t_1) = P_{iA} \quad (8)$$

the value PiA represents an amount which means the difference in phase at the time t1 between the satellite clock and the receiver clock. If it is presumed that there is no drift in the two clocks due to changes through aging and changes in temperature or the like, the value $P_{iA}$ will then maintain the value at the reference time as it is and thus becomes a constant value which is not dependent on time.

Further, since it took τ seconds for the radio waves to travel from the GPS satellite i to the survey point A at the speed of light c, the distance $\rho_{iA}$ between the GPS satellite i and the survey point A can be given by the formula $$\rho_{iA} = C \cdot \tau \tag{9}$$

The above formula can be re-written as $$\tau = \rho_{iA}/c \tag{10}$$

By substituting formula (10) and formula (8) for formula (7), the integrated carrier phase $\Phi_{i,A}(t_1)$ can be given by the following formula $$\Phi_{i,A}(t_1) = \rho_{iA} \cdot f/c + P_{iA} + N_{iA} \tag{11}$$

wherein the value $P_{iA}$ is a value called a real number value bias, which can neither be directly measured like the above-described integer value bias $N_{iA}$.

When the time has reached epoch $E_1$ while carrying out the above-described measurement, the program will be moved to step S2 for detecting the interruption of receiving. In case there has occurred no interruption of receiving due to receiving obstacles, the program can be moved from the step S2 for detecting the interruption of receiving to step S3 for recording.

In the step S3 for recording the integrated carrier phase $\Phi_{i,A}(E_1)$ (=$P_1$) at epoch $E_1$ is recorded, and the program is moved to step S5 for judging whether the measurement has been finished or not. When the desired number of data have not been recorded and the measurement cannot therefore be finished, the program is returned to the above-described step S1 for measuring to thereby continue the measurement.

Suppose that, as shown in FIG. 3, there was no interruption of receiving between epoch $E_1$ and epoch $E_2$ and that the integrated carrier phase was able to be measured without interruption. Let the time from epoch $E_1$ to epoch $E_2$ be $t_2$. Then, the value of the real value bias and the value of the integer value bias in the integrated carrier phase $\Phi_{i,A}(t_2)$ at time $t_2$ will be the same as the value at time $t_1$. Therefore, let the distance between the GPS satellite i and the survey point A at time $t_2$ be $\rho_{i,A}'$, and then the integrated carrier phase $\Phi_{i,A}(t_2)$ at time $t_2$ can be given by the following formula using the real number bias $P_{iA}$ and the integer value bias $N_{iA}$.

$$\Phi_{i,A}(t_2) = \rho_{iA}' \cdot f/c + P_{iA} + N_{iA} \tag{12}$$

When the time has reached epoch $E_2$, the program is moved to the step S2 for detecting the interruption of receiving. Since there was no interruption of receiving, the program is moved from the step S2 for detecting the interruption of receiving to the step S3 for recording, and is then returned to the step S1 for measuring via the step S5 for judging whether the measurement has been finished or not.

The step S1 for measuring performs the measurement of the integrated carrier phases until the time reaches epoch $E_3$.

Suppose that an interruption of receiving has occurred between epoch $E_2$ and epoch $E_3$ at time $U_1$ and that the interruption of receiving has ceased at time $U_2$. Then, it follows that the time Δt between the time $U_1$ and the time $U_2$ is the period of time at which the interruption of receiving occurred. Suppose that, in case where interruption of receiving has occurred, the receiving circuit will be put out of synchronization, with the result that the integrated carrier phase so far measured up to that time will become zero. Then, since the measurement can be resumed at the time $U_2$ at which the interruption of receiving ceased, the value of the carrier wave phase $G_3$ ($G_3 < 1$) at that time can be measured.

However, suppose that the integrated carrier phase at the time $U_2$ is $G_4$ when no interruption of receiving occurred. There will then occur a difference equivalent to an integer of the wave number between $G_4$ and $G_3$. As a consequence, there will also remain the same amount of difference between the integrated carrier phase $\Phi_{i,A}(E_2)$ recorded in the recording apparatus at epoch $E_2$ and the integrated carrier phase $\Phi'_{i,A}(E_3)$ at epoch $E_3$.

As a solution, the program is moved to step S2 for detecting the interruption of receiving in order to detect the interruption of receiving. The program is then moved to step S4 for correction to carry out the correction of the cycle slip contained in that integrated carrier phase $\Phi'_{i,A}(E_3)$ at epoch $E_3$ which is stored in an internal memory apparatus.

Figure 4:
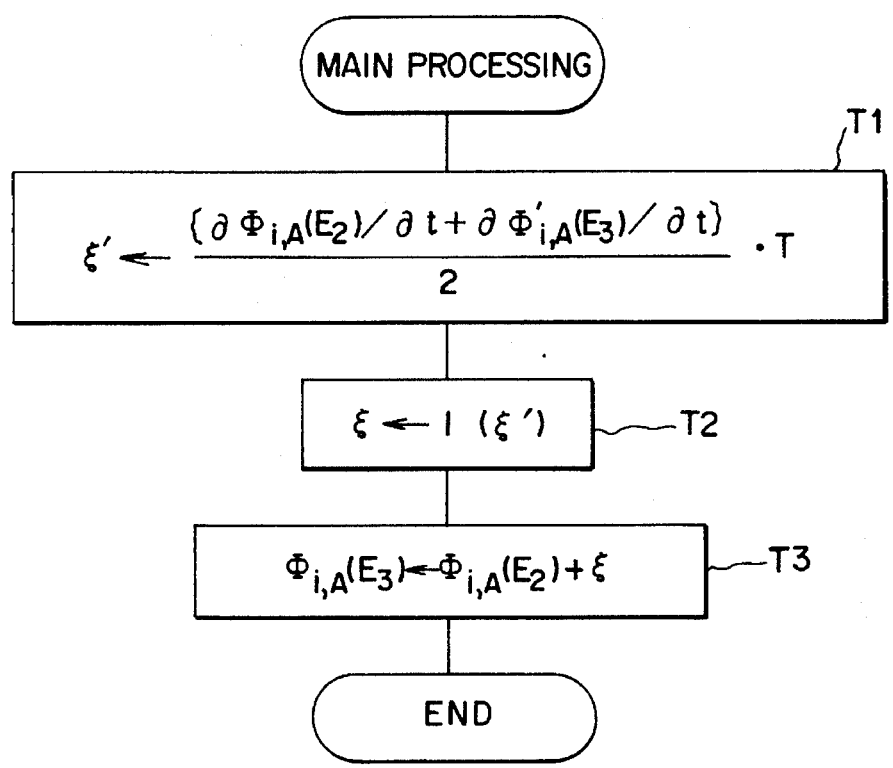
FIG. 4 is a flow chart showing an example of a process of correcting the integrated carrier phase.

The processing procedure of this step S4 for correction is shown in FIG. 4.

Referring to FIG. 4, reference numeral T1 is a step for calculating the amount of deviation. In this step, there is obtained an average value between a rate of change $\partial \Phi_{i,A}(E_2)/\partial t$ of the integrated carrier phase $\Phi_{i,A}(E_2)$ at epoch $E_2$ before the occurrence of interruption of receiving and a rate of change $\partial \Phi'_{i,A}(E_3)/\partial t$ of the integrated carrier phase $\Phi'_{i,A}(E_3)$ at epoch $E_3$ after the ceasing of interruption of receiving. Then, by multiplying this average value by the epoch interval T, the amount of deviation ξ' is calculated. Namely, the amount of deviation ξ' is given by the formula $$\xi' = (\partial \Phi_{i,A}(E_2)/\partial t + \partial \Phi'_{i,A}(E_3)/\partial t)/2 \cdot T \tag{21}$$

In this step the amount of deviation ξ' is calculated and the program is moved to step T2 for calculating the amount of correction.

By the way, instead of averaging the rate of changes at two epochs, it is also possible to calculate the amount of deviation by multiplying the rate of change of the integrated carrier phase at a single epoch such as only at epoch $E_2$ or the like, by the epoch interval T. However, in case that particular epoch happens to be an abnormal value that may occur unexpectedly, the rate of change of the integrated carrier phase will become an abnormal one. Consequently, the accuracy of the amount of deviation ξ' cannot be secured.

On the other hand, in order to obtain the amount of deviation more accurately, it is also possible to obtain an average value of the integrated carrier phases at three consecutive epochs inclusive of the period of interruption of receiving and then to multiply the average value by the epoch interval T, thereby using the result as the amount of deviation.

By the way, the amount of deviation ξ' as obtained in the above formula (21) is a real number value, but the actual integrated carrier phase that was lost by the interruption of receiving is an integer value. The amount of deviation ξ' obtained as a real number value can therefore be said to be different from the true amount of deviation. As a solution, in the step T2 for calculating the amount of correction, an integer value I(ξ') that is closest to the above-described amount of deviation ξ' is obtained and this value is made to be the amount of correction ξ which is the integrated carrier phase lost by the interruption of receiving. This amount of correction ξ is stored and the program is moved to step T3 for correcting the phase of the carrier waves.

In this step T3 for correcting the phase of the carrier waves, the integrated carrier phase $\Phi_{i,A}(E_3)$ that could have been measured at epoch $E_3$ if no interruption of receiving had occurred is calculated by adding the above-described amount of correction ξ to the integrated carrier phase $\Phi_{i,A}(E_2)$ that was recorded at epoch $E_2$ before the occurrence of interruption of receiving. It can be given as $$\Phi_{i,A}(E_3)=\Phi_{i,A}(E_2)+\xi \qquad (22)$$

The value $\Phi_{i,A}(E_3)$ is stored in the memory apparatus and the program is returned to the step S3 for recording in which the main processing is being carried out.

In this manner the above-described step S4 for correction corrects the cycle slip that is included in the integrated carrier phase. Therefore, the measured value to be recorded in the step S3 for recording will become an integrated carrier phase $\Phi_{i,A}(E_3)$ that does not include the cycle slip.

Then, in step S5 for judging whether the measurement has been finished or not, a judgement is made as to whether the measurement has been finished or not. If the measurement has not been finished, the procedure is returned to the step S1 for measuring. The measuring is continued and the measured values at each epoch such as epoch $E_4$, epoch $E_5$ or the like are recorded.

Since the integrated carrier phases after epoch $E_3$ have been measured based on the results of the above-described correction, the measured values to be recorded at each epoch is a value that does not contain a cycle slip. Namely, as shown in FIG. 3, in case the cycle slip is not corrected before and after the interruption of receiving, the measured values to be recorded at epoch $E_1$ through epoch $E_5$ will be discontinuous between P2 and P3' as represented by P1, P2, P3', P4' and P5'. On the contrary, since the above-described correction has been made, the measured values to be recorded at each epoch become continuous values as represented by P1, P2, P3, P4 and P5.

Once measurement of desired number of data has been made and the measurement has been finished, the program is moved from the step S5 for judging whether the measurement has been finished or not to step S6, where analysis of the measured values is started. This analysis is normally made by transferring the RAM card, which is the recording apparatus containing therein the records of the integrated carrier phases, to the RAM card drive apparatus 6 provided in the host computer.

The step S6 is a step for calculating a single phase difference. The single phase difference is a difference between the integrated carrier phases of the radio waves to be transmitted from the same GPS satellite but as measured at two different survey points.

Suppose that the frequency standard of the GPS satellite i and the frequency standard of the receiving apparatus 1 positioned at the survey point A deviate from a correct frequency f and that they respectively contain an amount of offset of $\delta_t(i)$ and $\delta_t(A)$. Then, the integrated carrier phase $\Phi_{i,A}(t)$ at time t as given by the above formula (11) as $$\Phi_{i,A}(t)=\rho_{i,A}\cdot f/c+P_{i,A}+N_{i,A} \qquad (30)$$

must be re-written as $$\Phi_{i,A}(t)=\rho_{i,A}\cdot f/c+N_{i,A}+P_{i,A}+f\cdot\{\delta_t(i)-\delta_t(A)\} \qquad (31)$$

On the other hand, the integrated carrier phase $\Phi_{i,B}(t)$ to be measured at the same time t by the second receiving apparatus 2 which is positioned at the unknown position B can be given, as in the above formula, as $$\Phi_{i,B}(t)=\rho_{i,B}\cdot f/c+N_{i,B}+P_{i,B}+f\cdot\{\delta_t(i)-\delta_t(B)\} \qquad (32)$$

If the single phase difference $D(i;A,B;t)$ at the survey point A and the survey point B relative to the GPS satellite i is defined by $$D(i;A,B;t)=\Phi_{i,B}(t)-\Phi_{i,A}(t) \qquad (33)$$

it can then be given by the above formula and formula (32) as $$D(i;A,B;t)=(\rho_{iB}-\rho_{iA})\cdot f/c+(N_{iB}-N_{iA})+(P_{iB}-P_{iA})+f\cdot\{-\delta_t(B)+\delta_t(A)\}tm \qquad (34)$$

If the single phase difference is obtained in this manner, the amount of offset $\delta_t(i)$ relating to the frequency standard of the GPS satellite can be deleted.

In a similar manner as the singe phase difference $D(i;A,B;t)$ relative to the GPS satellite i, the single phase difference $D(j;A,B;t)$ relative to the GPS satellite j at the survey point A and the survey point B can be given as $$\begin{aligned}D(j;A,B;t) &= \Phi_{jB}-\Phi_{jA} \\ &= (\rho_{jB}-\rho_{jA})\cdot f/c+(N_{jB}-N_{jA})+ \\ &\quad (P_{jB}-P_{jA})+f\cdot\{-\delta_t(B)+\delta_t(A)\}\end{aligned} \qquad (35)$$

In the step S6 for calculating the single phase difference, the single phase differences relative to the two survey points A, B and the four GPS satellites i, j, k and m are obtained and the program is moved to step S7.

The step S7 is for calculating a double phase difference. The double phase difference is a difference between the single phase differences and can be obtained in the following manner.

Let the double phase difference at the survey point A and the survey point B relative to %he GPS satellite i and the GPS satellite j be $DD(i,j;A,S;t)$. Then, the following applies.

$$\begin{aligned}DD(i,j;A,B;t) &= D(j;A,B;t)-D(i;A,B;t) \\ &= (\Phi_{j,B}-\Phi_{j,A})-(\Phi_{i,B}-\Phi_{i,A})\end{aligned} \qquad (41)$$

From the above formulae (34) and (35) the following formula can be obtained.

$$\begin{aligned}DD(i,j;A,B;t) &= D(j;A,B;t)-D(i;A,B;t) \\ &= (\rho_{jB}-\rho_{jA}-\rho_{iB}+\rho_{iA})\cdot f/c+ \\ &\quad (N_{jB}-N_{jA}-N_{iB}+N_{iA})+ \\ &\quad (P_{jB}-P_{jA}-P_{iB}+P_{iA})\end{aligned} \qquad (42)$$

In this manner, the amounts of offset $\delta_t(A)$ and $\delta_t(B)$ relating to the frequency standard of the receiving apparatus have also been deleted. By the way, the third item $P_{jB}-P_{jA}-P_{iB}+P_{iA}$ on the right side of the above formula is an amount called a real value bias item and each element thereof is given as $$P_{jB}=\psi_B(t)-\phi_j(t) \qquad (44)$$

$$P_{jA}=\psi_A(t)-\Phi_j(t) \qquad (45)$$

$$P_{iB}=\psi_B(t)-\phi_i(t) \qquad (46)$$

$$P_{iA}=\psi_A(t)-\phi_i(t) \qquad (47)$$

It follows that the value of $P_{jB}-P_{jA}-P_{iB}+P_{iA}$ will become zero, and the real value bias item is deleted. As a consequence, the above-described double phase difference $DD(i,j;A,B;t)$ Can be given by the following formula.

$$DD(i,j;A,B;t)=(\rho_{jB}-\rho_{jA}-\rho_{iB}+\rho_{iA})\cdot f/c+(N_{jB}-N_{jA}-N_{iB}+N_{iA}) \qquad (48)$$

Further, $N_{jB}-N_{jA}-N_{iB}+N_{iA}$ is an amount called an integer value bias item. If it is given in a sum as $$N_{jB}-N_{jA}-N_{iB}+N_{iA}=N_{ijAB} \qquad (49)$$

the formula (48) can be given by simplifying it as $$DD(i,j;A,B;t)=(\rho_{jB}-\rho_{jA}-\rho_{iB}+\rho_{iA})\cdot f/c+N_{ijAB} \qquad (50)$$

wherein the frequency standard f and the speed of light c are constants. The double phase difference DD(i,j;A,B;t) as represented by the above formula will therefore be a function having as variables only the amounts relating to the distance between each GPS satellite and each survey point as well as the integer value bias item.

If the integrated carrier phases to be transmitted from each of the four GPS satellites i, j, k and m can be measured simultaneously at the two survey points A and B, six kinds of double phase differences can be calculated by the combination $_4C_2$ in which two are selected out of the four GPS satellites. However, if three double phase differences are selected out of the six kinds of double phase differences, the remaining three double phase differences are in a subordinate relationship in that they can be calculated by the previously selected double phase differences and the remaining double phase differences can be said to be dependent amounts. As a consequence, if four GPS satellites are measured at two survey points, independent double phase differences that can be calculated simultaneously remain to be only three kinds.

In the step S7 for calculating the double phase difference, triple phase difference is also obtained simultaneously. Here, the triple phase difference means an amount of difference between the double phase differences at two times, and can be obtained in the following manner.

Let the distances between the survey points A, B and the GPS satellites i, j at epoch $E_n$ (time $E_n$) and epoch $E_m$ (time $E_m$) be $\rho(i,A;E_n)$, $\rho(j,A;E_n)$, $\rho(i,B;E_n)$ and $\rho(j,B;E_n)$, respectively. Then, the double phase differences $DD(i,j;A,B;E_n)$ and $DD(i,j;A,B;E_m)$ can be given, in a similar manner as the formula (50), as $$DD(i,j;A,B;E_n)=(\rho(j,B;E_n)-\rho(j,A;E_n)-\rho(i,B;E_n)+\rho(i,A;E_n)) \cdot f/c + N_{ijAB} \quad (51)$$

$$DD(i,j;A,B;Em)=(\rho(j,B;E_m)-\rho(j,A;E_m)-\rho(i,B;E_m)+\rho(i,A;E_m)) \cdot f/c + N_{ijAB} \quad (52)$$

The difference between formula (51) and formula (52), namely, $DD(i,j;A,B;E_n)-DD(i,J;A,B;E_m)$, is the triple phase difference. Since the integer number bias item $N_{ijAB}$ has been deleted from this triple phase difference, if simultaneous equations are set up with those coordinate values of the three-dimensional coordinates of the unknown point B which have been obtained by the single positioning or the like as an initial value, approximate values of the three-dimensional coordinates of the unknown point B can be obtained. After the triple phase difference has thus been obtained from each difference of the double phase difference and the approximate values of the three-dimensional coordinate values of the unknown point B have been stored, the program is moved to step S8.

The step S8 is for calculating the coordinates, in which the coordinate values of the three-dimensional coordinates of the survey point B, which is the unknown point, are calculated in accordance with the following calculating principle based on the double phase difference and the triple phase difference which were obtained in the previous step S7.

Let arbitrary two epochs out of the integrated carrier phases recorded in the step S3 for recording be epoch L1 and epoch L2, and let the double phase difference relating to the GPS satellite i and the GPS satellite j at epoch L1 be DD(i,j;A,B;1). Then, the following relationship can be established between the double phase difference DD(i,j;A,B;1) and the integer value bias $N_{ij}$.

$$DD(i,j;A,B;1)=\{-\rho(i,A;1)+\rho(i,B;1)-\rho(j,A;1)++\rho(j,B;1)\} \cdot f/c + N_{ij} \quad (61)$$

The following relationship can also be established between each double phase difference and each integer value bias with respect to the GPS satellite i and the GPS satellite k as well as to the GPS satellite i and the GPS satellite m in a similar manner as in the above formula.

$$DD(i,k;A,B;1)=\{-\rho(i,A;1)+\rho(i,B;1)-\rho(k,A;1)+\rho(k,B;1)\} \cdot f/c + N_{ik} \quad (62)$$

$$DD(i,m;A,B;1)=\{-\rho(i,A;1)+\rho(i,B;1)-\rho(m,A;1)+\rho(m,B;1)\} \cdot f/c + N_{im} \quad (63)$$

Since the above-described integer value biases $N_{ij}$, $N_{ik}$ and $N_{im}$ are also of the same values at epoch L2, the following formulae can be established relating to the double phase difference at epoch L2.

$$DD(i,j;A,B;2)=\{-\rho(i,A;2)+\rho(i,B;2)-\rho(j,A;2)+\rho(j,B;2)\} \cdot f/c + N_{ij} \quad (64)$$

$$DD(i,k;A,B;2)=\{-\rho(i,A;2)+\rho(i,B;2)-\rho(k,A;2)+\rho(k,B;2)\} \cdot f/c + N_{ik} \quad (65)$$

$$DD(i,m;A,B;2)=\{-\rho(i,A;2)+\rho(i,B;2)-\rho(m,A;2)+\rho(m,B;2)\} \cdot f/c + N_{im} \quad (66)$$

Here, since the coordinate values X(u) of the three-dimensional coordinate values of the GPS satellite at an arbitrary time u can be obtained by the orbit information, the position of the GPS satellite at any epoch can be identified based on the ephemeris data.

It is, however, necessary to take into consideration the delay time in propagation of the radio waves. For example, suppose that the radio waves transmitted from the GPS satellite i, for example, reached the survey point A at time u1 at a lapse of time $\tau_1$. The radio waves are the ones transmitted from the GPS satellite i at the time $u_1-\tau_1$. The following relationship can therefore be established between $\tau_1$ and the distance $\rho(i,A;u_1)$ between the GPS satellite i and the survey point A.

$$\tau_1=\rho(i,A;u_1)/c \quad (70)$$

Here, if the point at which the GPS satellite i is positioned at time t is represented in terms of vector $X_i(t)$, the vector $X_i(u_1-\tau_1)$ representing the point at which the GPS satellite i will be located at time $u_1-\tau_1$ can be given by the formula $$X_i(u_1-\tau_1)=X_i(u_1-\rho(i,A;u_1)/c) \quad (71)$$

On the other hand, let the vector representing the three-dimensional coordinates of the survey point A, which is the known point, be XA and let the magnitude of the vector M be represented by $\|M\|$, the above-described distance $\rho(i,A;u_1)$ can be given by the formula $$\rho(i,A;u_1)=\|X_i(u_1-\rho(i,A;u_1)/c)-X_A\| \quad (72)$$

If repeated calculations are made by substituting an approximate value for the value $\rho(i,A;u_1)$, more accurate value of $\rho(i,A;u_1)$ can be calculated.

From the above explanations, it can be seen that the distance between each GPS satellite and the known point A can be calculated. Consequently, since the values $\rho(i,A;1)$, $\rho(j,A;1)$, $\rho(k,A;1)$, $\rho(m,A;1)$, $\rho(i,A;2)$, $\rho(j,A;2)$, $\rho(k,A;2)$ and $\rho(m,A;2)$ in the six formulae (61) through (66) are known, the unknown amounts in the six formulae will be values $\rho(i,B;1)$, $\rho(j,B;1)$, $\rho(k,B;1)$, $\rho(m,B;1)$, $\rho(i,B;2)$, $\rho(j,B;2)$, $\rho(k,B;2)$ and $\rho(m,B;2)$ which represent the distance between the survey point B, which is the unknown point, and each GPS satellite. These distances are returned to a total of six unknown values, i.e., three of X-axis, Y-axis and Z-axis coordinate values of the three-dimensional coordinates of the survey point B and three of the integer value biases $N_{ij}$, $N_{ik}$ and $N_{im}$. As a consequence, since the number of the unknown values and the number of the simultaneous equations coincide with each other, all of the six unknown values can be obtained by calculating the six formulae (61) through (66) as simultaneous equations.

However, even if the above six equations (61) through (66) are set up as simultaneous equations, the result will not be linear and, therefore, they cannot be solved by an analytical method. As a solution, the following method is employed. Namely, the approximate values of the coordinate values of the unknown point B as obtained by the above-described triple phase differences are substituted as initial values in the simultaneous equations made up of the formulae (61) through (66). Repeated calculations are then made to gradually minimizing the errors contained in the coordinate values of the three-dimensional coordinates of the unknown point B, thereby obtaining accurate coordinate values of the three-dimensional coordinates of the unknown point B.

When the coordinate values of the three-dimensional coordinates of the unknown point B have thus been obtained, the integer value biases $N_{ij}$, $N_{ik}$ and $N_{im}$ can also be obtained simultaneously. Those values are, however, not integer values but are normally real number values. This is mainly because of the influence of the measurement errors. If the real number values are once rounded into nearest integer number values and are calculated again by the least squares method using those values as the integer value biases, more accurate coordinate values of the three-dimensional coordinates of the unknown point B can be obtained.

From the above processing the coordinate values of the three-dimensional coordinates of the unknown point B are calculated and the results are displayed on the display apparatus 7 in step S9 for displaying. The processing is thus finished.

In kinematic surveying, if the integer bias values are established by carrying out antenna swapping or the like at the known point A and then the measurement is made by moving the antenna to a plurality of unknown points while continuing the measurement of the integrated carrier phases, the coordinate values of the three-dimensional coordinates of each unknown point can be obtained in a similar manner as in the above processing.

Figure 5:
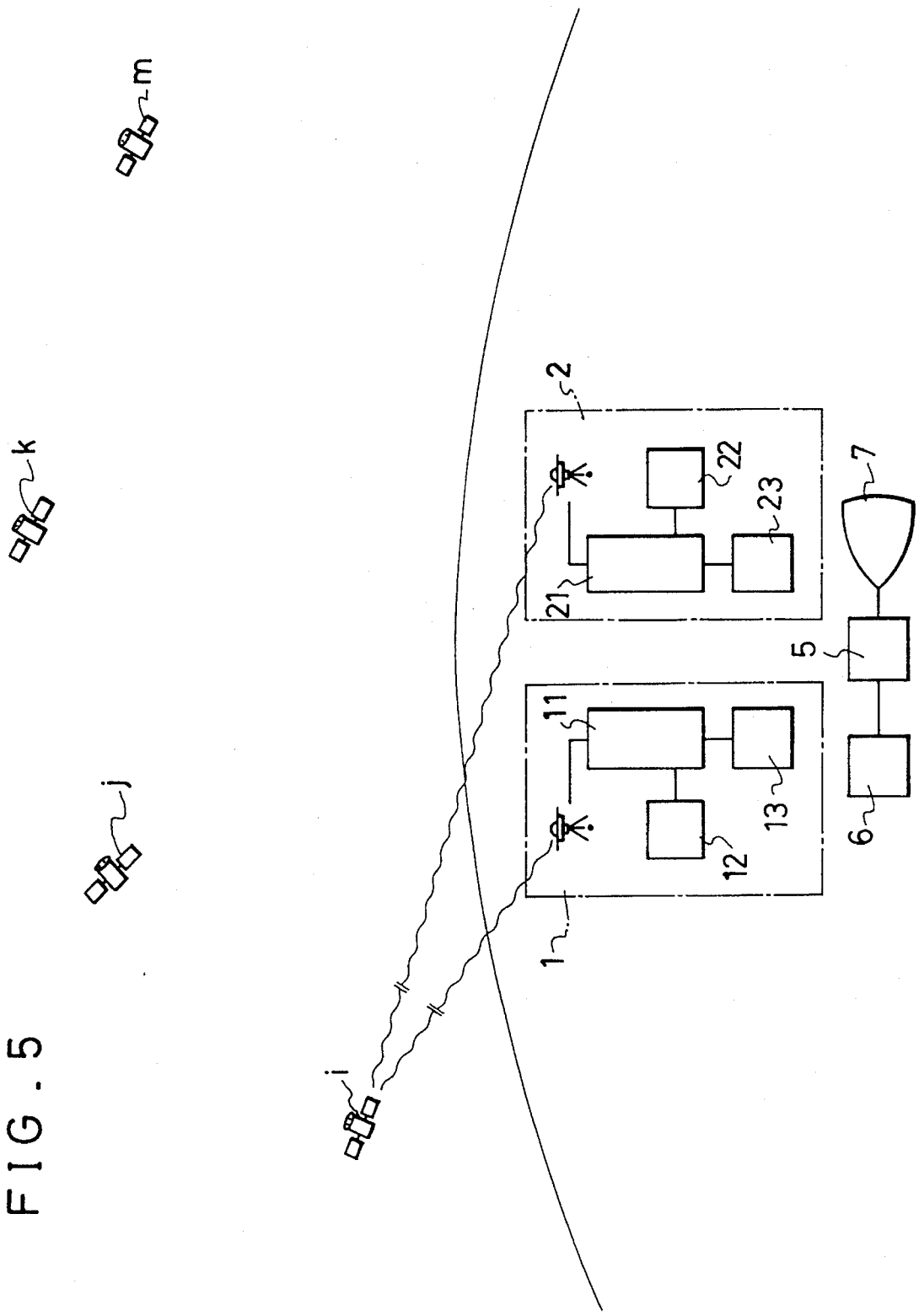
FIG. 5 is a schematic diagram showing an example of an apparatus for carrying out the relative surveying GPS of the present invention.

FIG. 5 shows an example of an apparatus for carrying out the above-described relative positioning GPS of the present invention.

Referring to FIG. 5, reference alphabets i, j, k and m denote GPS satellites, numeral 1 denotes the first receiving apparatus to be positioned at the known survey point A and numeral 2 denotes the second receiving apparatus to be positioned in the unknown survey point B as explained with reference to FIG. 1. The first receiving apparatus 1 has a calculating means 11 for calculating an integrated carrier phase of the radio waves to be received by the first receiving apparatus 1, a recording means 12 such as a RAM card for recording the integrated carrier phase that is calculated in the above-described calculating means 11, and a storing means 13 for storing the data measured by the first receiving apparatus 1. The second receiving apparatus 2 has a calculating means 21 for calculating an integrated carrier phase of the radio waves to be received by the second receiving apparatus 2, a recording means 22 such as a RAM card for recording the integrated carrier phase that is calculated in the above-described calculating means 21, and a storing means 23 for storing the data measured by the second receiving apparatus 2. Reference numeral 5 denotes the computing means such as the host computer as shown in FIG. 1 for computing the coordinate values of three-dimensional coordinates of the unknown point B based on the integrated carrier phases recorded in the recording means 12, 22 as shown in FIG. 1. Reference numeral 6 denotes a driving means for driving the RAM cards in the recording means 12, 22. The computed coordinate values are displayed on the display means 7.

According to the present invention, even if an interruption of receiving may occur during the measurement of the integrated carrier phase, the cycle slip contained in the integrated carrier phase can be corrected. Therefore, the integrated carrier phase from which the effects of the interruption of receiving have been deleted can be recorded.

Particularly, in a kinematic surveying, even if the interruption of receiving may occur during the moving operation of the receiving apparatus, the cycle slip can be corrected. Therefore, it becomes not necessary to measure again by going back to the point for which the measurement has already been finished before the interruption of receiving.

It is readily apparent that the above-described relative positioning and an apparatus for carrying out the relative positioning meet all of the objects mentioned above and also have the advantages of wide commercial utility. It should be understood that the specific forms of the invention hereinabove described are intended to be representative only, as certain modifications within the scope of these teaching will be apparent to those skilled in the art.

Accordingly, reference should be made to the following claims in determining the full scope of the invention.

What is claimed is:

1. A relative positioning GPS using at least four GPS satellites which travel on satellite orbits and a GPS surveying system having a first receiving apparatus for receiving radio waves to be transmitted from each of said GPS satellites and a second receiving apparatus for receiving radio waves to be transmitted from each of said GPS satellites, said relative positioning GPS comprising the steps of:

disposing said first receiving apparatus in a known point;

disposing said second receiving apparatus in an unknown point;

measuring an integrated carrier phase of the radio waves to be received by each of said receiving apparatuses;

recording said integrated carrier phase at every predetermined interval of time; and obtaining three-dimensional coordinate values of the unknown point based on the recorded integrated carrier phase, wherein, when interruption of receiving of the radio waves to be transmitted from said GPS satellites has occurred during said measuring and recording steps, said interruption of receiving is detected and a cycle slip included in said measured integrated carrier phase is corrected after ceasing of said interruption of receiving and, wherein correction of said cycle slip comprises the steps of:

obtaining an average value of a rate of change of an integrated carrier phase at a predetermined time before said interruption of receiving and a rate of change of an integrated carrier phase at a predetermined time after ceasing of said interruption of receiving;

calculating a correction amount of a real number value by multiplying said average value by a time between said predetermined time before said interruption of receiving and said predetermined time after ceasing of said interruption of receiving;

calculating a correction amount of an integer number value by rounding said correction amount of said real number value to a nearest integer number; and correcting said cycle slip included in said integrated carrier phase after said ceasing of said interruption of receiving by adding said correction amount of said integer number value to said integrated carrier phase at said predetermined time before said interruption of receiving.

2. A relative positioning GPS according to claim 1, wherein three-dimensional coordinate values of each unknown point are obtained by moving said second receiving apparatus among unknown points.

3. An apparatus for carrying out a relative positioning GPS using at least four GPS satellites which travel on satellite orbits, a first receiving apparatus disposed in a known point and arranged for receiving radio waves to be transmitted from each of said GPS satellites and a second receiving apparatus disposed in another point and arranged for receiving radio waves to be transmitted for each of said GPS satellites, said apparatus comprising:

means for calculating integrated carrier phases of the radio waves to be received by said first receiving apparatus and said second receiving apparatus;

means for recording said integrated carrier phases at every predetermined interval of time;

means for computing three-dimensional coordinate values of said unknown point based on said recorded integrated carrier phases, wherein said means for calculating integrated carrier phases detects an interruption of receiving of the radio waves to be transmitted from said GPS satellites when such an interruption of receiving has occurred, corrects a cycle slip included in said measured integrated carrier phases after ceasing of said interruption of receiving, and records on said means for recording said integrated carrier phases after said correction so as to obtain three-dimensional coordinate values of said unknown point, and wherein said means for calculating integrated carrier phases obtains an average value of a rate of change of an integrated carrier phase at a predetermined time before said interruption of receiving and a rate of change of an integrated carrier phase at a predetermined time after ceasing of said interruption of receiving, calculates a correction amount of a real number value by multiplying said average value by a time between said predetermined time before said interruption of receiving and said predetermined time after ceasing of said interruption of receiving, calculates a correction amount of an integer number value by rounding said correction amount of said real number value to a nearest integer number, and corrects a cycle slip included in said integrated carrier phase after said ceasing of said interruption of receiving by adding said correction amount of said integer number value to the integrated carrier phase at said predetermined time before said interruption of receiving.

4. An apparatus for carrying out a relative positioning GPS according to claim 3, wherein said second receiving apparatus is arranged to be movable among unknown points.

\* \* \* \* \*